United States Patent

Suzuki et al.

[11] Patent Number: 5,619,301
[45] Date of Patent: Apr. 8, 1997

[54] DETECTOR FOR DETECTING FOCUSING STATE OR DISTANCE OF PHOTOGRAPHED OBJECT

[75] Inventors: Akira Suzuki, Kawasaki; Takao Saito, Yokohama, both of Japan

[73] Assignee: Ricoh Company, Ltd., Tokyo, Japan

[21] Appl. No.: 632,093

[22] Filed: Apr. 15, 1996

Related U.S. Application Data

[63] Continuation of Ser. No. 174,704, Dec. 29, 1993, abandoned.

[30] Foreign Application Priority Data

Dec. 31, 1992 [JP] Japan .................................... 4-361035
Sep. 10, 1993 [JP] Japan .................................... 5-248592

[51] Int. Cl.⁶ .................................................... G03B 13/36
[52] U.S. Cl. .................................... 396/114; 396/128
[58] Field of Search ................................ 354/400, 402, 354/407, 408, 406

[56] References Cited

U.S. PATENT DOCUMENTS

| | | | |
|---|---|---|---|
| 4,816,861 | 3/1989 | Taniguchi et al. | 354/408 |
| 5,069,543 | 12/1991 | Kitajima et al. | |
| 5,113,215 | 5/1992 | Nishibe | 354/408 |
| 5,192,860 | 3/1993 | Shinohara et al. | 354/407 |
| 5,381,206 | 1/1995 | Akashi et al. | 354/402 |

FOREIGN PATENT DOCUMENTS 62-205324  9/1987  Japan .
63-18312   1/1988  Japan .

*Primary Examiner*—Russell E. Adams
*Attorney, Agent, or Firm*—Oblon, Spivak, McClelland, Maier & Neustadt, P.C.

[57] ABSTRACT

In a focusing state or photographed object distance detector, a pair of distance measuring lenses are arranged in positions symmetrical with respect to the reference axis of a photographing lens. A pair of light-receiving element arrays are arranged behind the pair of distance measuring lenses. A pair of image signals are obtained by controlling operations of the light-receiving element arrays by CCD control sections. A conformity degree between these image signals is calculated by an integral part shifting arithmetic circuit in an element unit of each of the light-receiving element arrays. An interpolating calculation of the conformity degree is made by a decimal part arithmetic circuit to provide a precise conformity degree distribution. When a shifting amount of the pair of image signals is calculated by a shifting amount arithmetic circuit, a distribution portion providing a high conformity degree is greatly weighted by a weighting arithmetic circuit so that the shifting amount is obtained with high reliability.

9 Claims, 13 Drawing Sheets

DETECTOR FOR DETECTING FOCUSING STATE OR DISTANCE OF PHOTOGRAPHED OBJECT

This application is a continuation of application Ser. No. 08/174,704, filed on Dec. 29, 1993, now abandoned.

BACKGROUND OF THE INVENTION

1. Field of the Invention

The present invention relates to an improvement of a detector for detecting a focusing state or a distance of a photographed object in which a light beam from the photographed object is received by a pair of light-receiving element arrays for detecting the focusing state or the distance of the photographed object, and the focusing state or the distance of the photographed object is detected by calculating an image shifting amount of image information in two systems outputted from the pair of light-receiving element arrays.

2. Description of the Related Art

In the focusing state or photographed object distance detector of this kind, image information obtained from two light-receiving element arrays are relatively shifted from each other to detect a discrete shifting amount having a highest correlation. An interpolating calculation is made on the basis of the discrete shifting amount. A continuous image shifting amount is calculated by performing interpolation using this interpolating calculated value so as to detect the focusing state or the distance of the photographed object.

In this case, there is a case in which an error in two image information is caused since an image is deformed by an error in A/D conversion, aberrations of an automatic focusing optical system, flare, etc. Such an error in two image information causes an error in image shifting amount.

Accordingly, in the general focusing state or photographed object distance detector, the focusing state or the distance of the photographed object is more accurately detected by using various kinds of methods.

For example, in Japanese Patent Application Laying Open (KOKAI) No. 62-205324, two light-receiving element arrays are arranged within a path of transmitted light in a photographing optical system such that these two light-receiving element arrays are symmetrically located with respect to a photographing optical axis. Each of the two light-receiving element arrays receives each of two symmetrical light beams transmitted through the photographing optical system. An interpolating calculation is made by using a correlational value of image signals from these two light-receiving element arrays and a contrast value of the photographed object. A reliable interpolating value with respect to a distance between two images is obtained by this interpolating calculation. Thus, the focusing state or the distance of the photographed object is detected with stable accuracy.

Japanese Patent Application Laying Open (KOKAI) No. 63-18312 shows a technique for detecting a focusing state or a distance of a photographed object similar to that shown in the above Japanese Patent Application Laying Open (KOKAI) No. 62-205324. In this technique, light beams are focused and formed as two images on two light-receiving element arrays through a photographing optical system. Contrast evaluating amounts are compared with each other in all ranges of relative displacements (or image shifts) of these two images. The focusings rate or the photographed object distance is more accurately detected by using a larger focusing contrast evaluating amount in calculation of an image shifting amount.

As mentioned above, in the general focusing state or photographed object distance detector, two image contrasts are used as parameters for performing a focusing operation, or contrast values are set to parameters when evaluated results of the image contrasts are judged, thereby improving a calculating accuracy. However, there is a limit in improvement of the calculating accuracy using such a method. Accordingly, it is desirable to improve the calculating accuracy by using another method, or detect the focusing state or the distance of the photographed object with high accuracy by using another method.

SUMMARY OF THE INVENTION

It is therefore an object of the present invention to provide a detector for detecting a focusing state or a distance of a photographed object in which a light beam from the same photographed object is received by a pair of light-receiving element arrays for detecting the focusing state or the distance of the photographed object, and an image data portion providing a high conformity degree of image information in two systems outputted from these two light-receiving element arrays is preferentially calculated so that an image data portion having a large error is removed from the image information and an image shifting amount can be calculated with high accuracy.

In accordance with a first structure of the present invention, the above object can be achieved by a focusing state or photographed object distance detector comprising a pair of light-receiving element arrays for receiving a light beam from a photographed object to detect a focusing state or a distance of the photographed object; the focusing state or the distance of the photographed object being detected by calculating an image shifting amount of image information in two systems outputted from the pair of light-receiving element arrays when the light beam is received by the pair of light-receiving element arrays; and the detector being constructed such that the image shifting amount of the image information in the two systems is calculated in the detection of the focusing state or the photographed object distance by greatly weighting image data providing a high conformity degree of the image information in the two systems in comparison with image data providing a conformity degree which is not high.

In accordance with a second structure of the present invention, the above object can be also achieved by a focusing state or photographed object distance detector comprising a pair of light-receiving element arrays for receiving a light beam from a photographed object to detect a focusing state or a distance of the photographed object; the focusing state or the distance of the photographed object being detected by calculating an image shifting amount of image information in two systems outputted from the pair of light-receiving element arrays when the light beam is received by the pair of light-receiving element arrays; and the detector being constructed such that the image shifting amount of the image information in the two systems is calculated in the detection of the focusing state or the photographed object distance by using only image data providing a high conformity degree of the image information in the two systems.

In accordance with a third structure of the present invention, the conformity degree of the image information in the two systems in the first or second structure is set to a reliable parameter representing reliability of image reproducibility. Further, it is judged by using this parameter whether the focusing state or the photographed object distance can be detected or not by using the above image information.

In accordance with a fourth structure of the present invention, a height of the conformity degree of the image information in the two systems in each of the first to third structures is evaluated by comparing inclinations of curves about the image information with each other every point of the image information.

In the above focusing state or photographed object distance detector, a light beam from the photographed object is received by each of the light-receiving element arrays for detecting the focusing state or the photographed object distance. When the light beam is received by each of the light-receiving element arrays, the focusing state or the distance of the photographed object is detected by calculating an image shifting amount of image information in two systems outputted from the pair of light-receiving element arrays. The image shifting amount of the image information in the two systems is calculated in the detection of the focusing state or the photographed object distance by greatly weighting image data providing a high conformity degree of the image information in the two systems in comparison with another image data providing a conformity degree which is not high.

Thus, when the focusing state or the photographed object distance is detected, the image shifting amount can be calculated with high accuracy by removing image data having a large error from the image information. In another weighting method, the image shifting amount of the image information in the two systems may be calculated by using only image data providing a high conformity degree of the image information in the two systems.

Further, the conformity degree of the image information in the two systems is set to a reliable parameter representing reliability of image reproducibility. It is judged on the basis this parameter whether the focusing state or the photographed object distance can be detected or not by using the above image information.

In a concrete weighting method, a height of the conformity degree of the image information in the two systems is evaluated by comparing inclinations of curves about the image information with each other every point of the image information.

In the above focusing state or photographed object distance detector, a light beam from the same photographed object is received by each of the light-receiving element arrays for detecting the focusing state or the distance of the photographed object. An image data portion providing a high conformity degree of the image information in the two systems outputted from these two light-receiving element arrays is preferentially calculated so that an image data portion having a large error is removed from the image information and the image shifting amount can be calculated with high accuracy.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a detector for detecting a focusing state or a distance of a photographed object in the present invention will next be described in detail with reference to the accompanying drawings.

Figure 1:
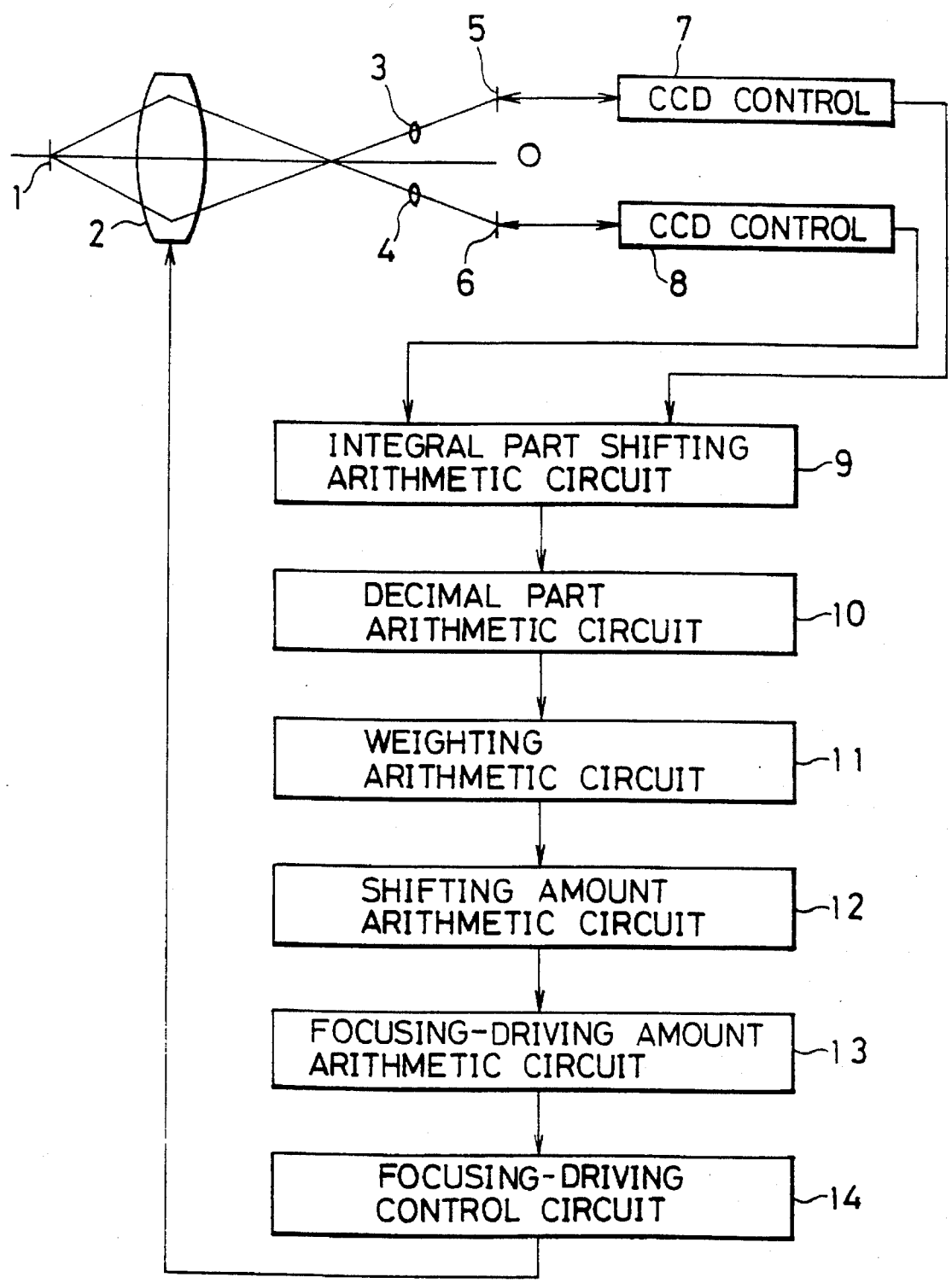
FIG. 1 is a block diagram showing the entire construction of a focusing state or photographed object distance detector in accordance with one embodiment of the present invention.

FIG. 1 is a block diagram showing the entire construction of a focusing state or photographed object distance detector in accordance with one embodiment of the present invention. As shown in FIG. 1, a pair of distance measuring lenses 3 and 4 are arranged behind a focal point face which is located behind a photographing lens 2 directed toward a photographed object 1. Each of the distance measuring lenses 3 and 4 is also called an image reforming lens. In a first case, each of the distance measuring lenses 3 and 4 is arranged within a path of transmitted light in a photographing optical system as shown in the above-mentioned two Japanese Laid-Open Patents. In a second case, each of the distance measuring lenses 3 and 4 is arranged outside the path of transmitted light in the photographing optical system. In the present invention, the focusing state or photographed object distance detector can be used in each of the first and second cases.

In this embodiment, the pair of distance measuring lenses 3 and 4 are arranged within the path of transmitted light in the photographing optical system. In this first case, the photographing optical axis of a lens system is set to a reference line O directed to the photographed object. In contrast to this, in the second case in which each of the distance measuring lenses 3 and 4 is arranged outside the path of transmitted light in the photographing optical system, the photographing optical axis or a line parallel to this photographing optical axis is set to a reference line O.

Figure 2:
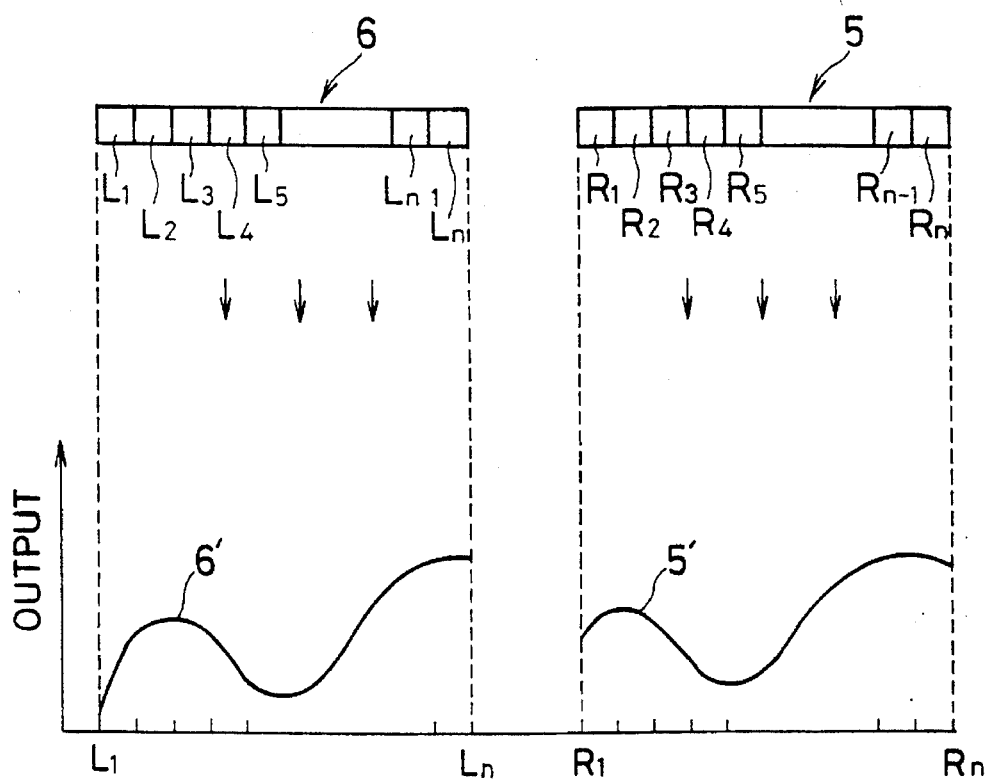
FIG. 2 is a typical constructional view showing the construction of a pair of light-receiving element arrays shown in FIG. 1 in association with output waveforms of the light-receiving element arrays.

A pair of light-receiving element arrays 5 and 6 are respectively arranged on focal point faces of the pair of distance measuring lenses 3 and 4 to detect a focusing state or a distance of a photographed object. The right-hand light-receiving element array 5 is arranged on the focal point face of the right-hand distance measuring lens 3. As shown in FIG. 2, for example, the right-hand light-receiving element array 5 is constructed by a line sensor in which a plurality of light-receiving elements $R_1$ to $R_n$ are composed of charge coupled devices (CCDs) and are aligned with each other on a face perpendicular to an optical axis of the right-hand distance measuring lens 3.

The left-hand light-receiving element array 6 is arranged on the focal point face of the left-hand distance measuring lens 4. As shown in FIG. 2, for example, the left-hand light-receiving element array 6 is constructed by a line sensor in which a plurality of light-receiving elements $L_1$ to $L_n$ are composed of charge coupled devices (CCDs) and are aligned with each other on a face perpendicular to an optical axis of the left-hand distance measuring lens 4. This face perpendicular to the optical axis of the left-hand distance measuring lens 4 is arranged in the same direction as the right-hand light-receiving element array 5.

The optical axes of the distance measuring lenses 3 and 4 are parallel to each other and are also parallel to the above reference line O as an optical axis of the photographing lens 2.

A light beam from the photographed object 1 is incident to the pair of distance measuring lenses 3 and 4. A light beam for distance measurement incident to the right-hand distance measuring lens 3 is focused and formed as an image on the right-hand light-receiving element array 5. A light beam for distance measurement incident to the left-hand distance measuring lens 4 is focused and formed as an image on the left-hand light-receiving element array 6. Thus, two optical images are symmetrically formed with respect to the reference line O. As shown in FIG. 2, photoelectrically converted outputs of the light-receiving elements $R_1$ to $R_n$ and the light-receiving elements $L_1$ to $L_n$ respectively have waveforms having difference phases in accordance with distances of the photographed object.

Figure 3:
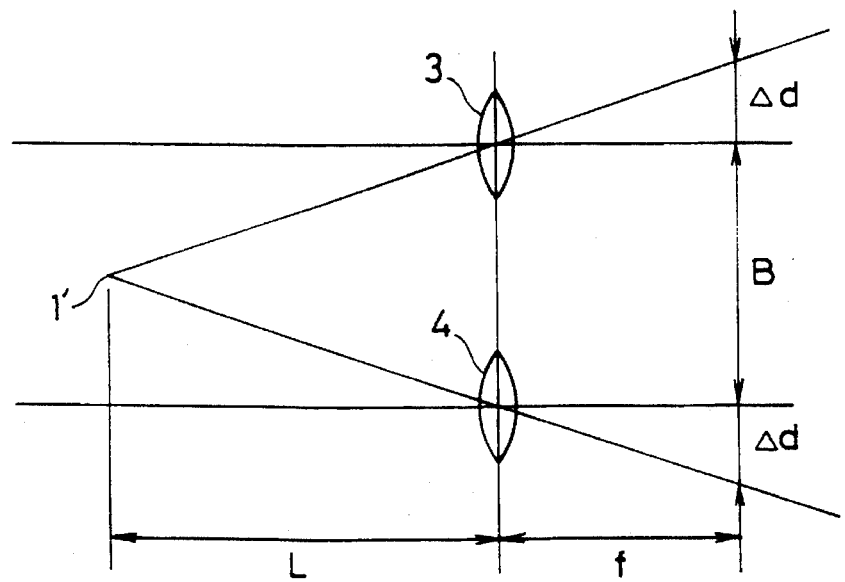
FIG. 3 is a typical constructional view showing the relation between construction and arrangement of a pair of distance measuring lenses shown in FIG. 1.

Strictly speaking, each of these waveforms is not a continuous waveform, but is equal to a stepwise waveform corresponding to each of the number of light-receiving elements $R_1$ to $R_n$ and the number of light-receiving elements $L_1$ to $L_n$. As shown in FIG. 3, when a photographed object 1' is located at a finite distance L, a shifting amount $\Delta d$ of optical images is proportional to 1/L. In other words, if a base length is set to B and a distance between the formed images is set to f, the optical image shifting amount $\Delta d$ is provided as follows.

$$\Delta d = Bf/L$$

Accordingly, the two optical images formed by the light-receiving element arrays 5 and 6 are located in positions shifted by an equal distance $\Delta d/2$ from the respective optical axes toward the respective exteriors.

In FIG. 1, CCD control sections 7 and 8 are respectively connected to the light-receiving element arrays 5 and 6 and control operations of the light-receiving elements $R_1$ to $R_n$ and the light-receiving elements $L_1$ to $L_n$. Outputs of the CCD control sections 7 and 8 respectively correspond to the optical images formed by the light-receiving element arrays 5 and 6. As shown in FIG. 2, the light-receiving element arrays 5 and 6 respectively output right-hand image information 5' and left-hand image information 5'.

Thus, in this embodiment, the pair of distance measuring lenses 3, 4 and the pair of light-receiving element arrays 5, 6 constitute an image reforming optical system similar to that shown in the above Japanese Laid-Open Patents.

Figure 4:
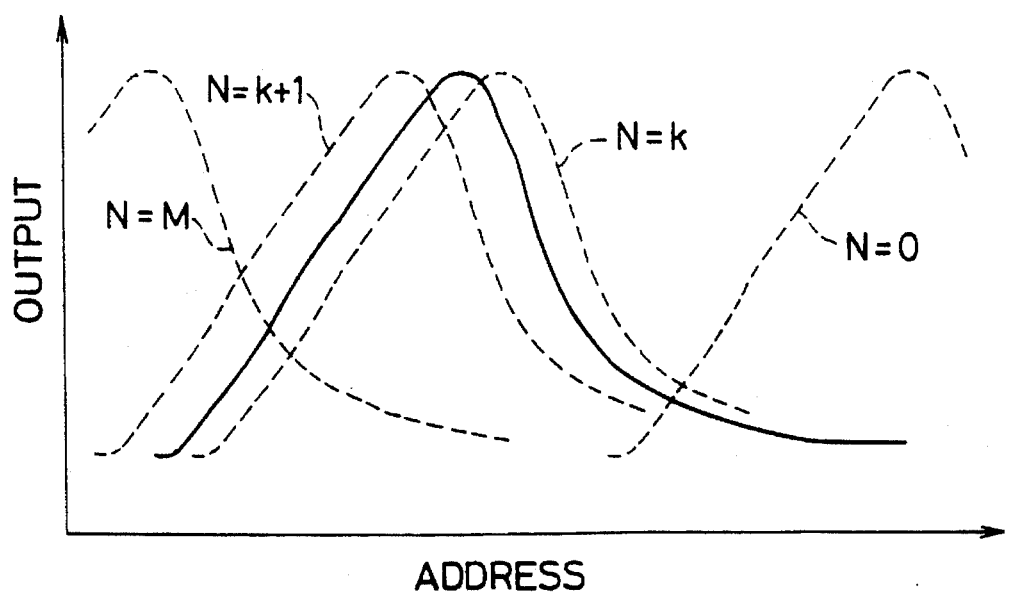
FIG. 4 is a view of image information outputs showing the relation in phase between left-hand and right-hand image information photoelectrically outputted from the pair of light-receiving element arrays shown in FIG. 1.
Figure 5:
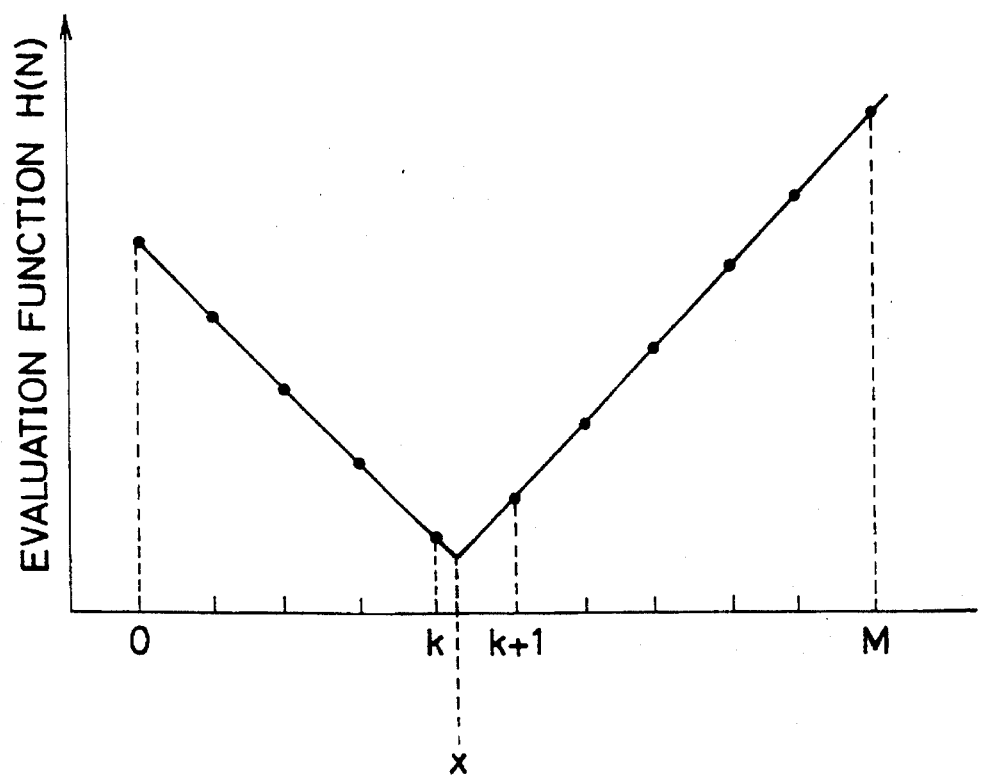
FIG. 5 is a waveform diagram showing a change in conformity degree as an evaluation function in the focusing state or photographed object distance detector in accordance with one embodiment of the present invention.

In the present invention, the focusing state or photographed object distance detector electrically processes the right-hand image information 5' and the left-hand image information 6' by using a general correlational shift calculating method. As shown in FIG. 4, a portion or all of the right-hand image information 5' are relatively shifted from a portion or all of the left-hand image information 6' in a horizontal direction. In FIG. 4, reference numeral N designates a relative shifting amount of the image information. Data indicative of a conformity degree Q of both the shifted image information 5' and 6' are plotted to calculate an evaluation function H(N). As shown in FIG. 5, a local minimum value x is interpolatively estimated from discrete data [o, H(o)], - - - , [k, H(k)], [k+1, H(K+1)], etc.

Figure 6:
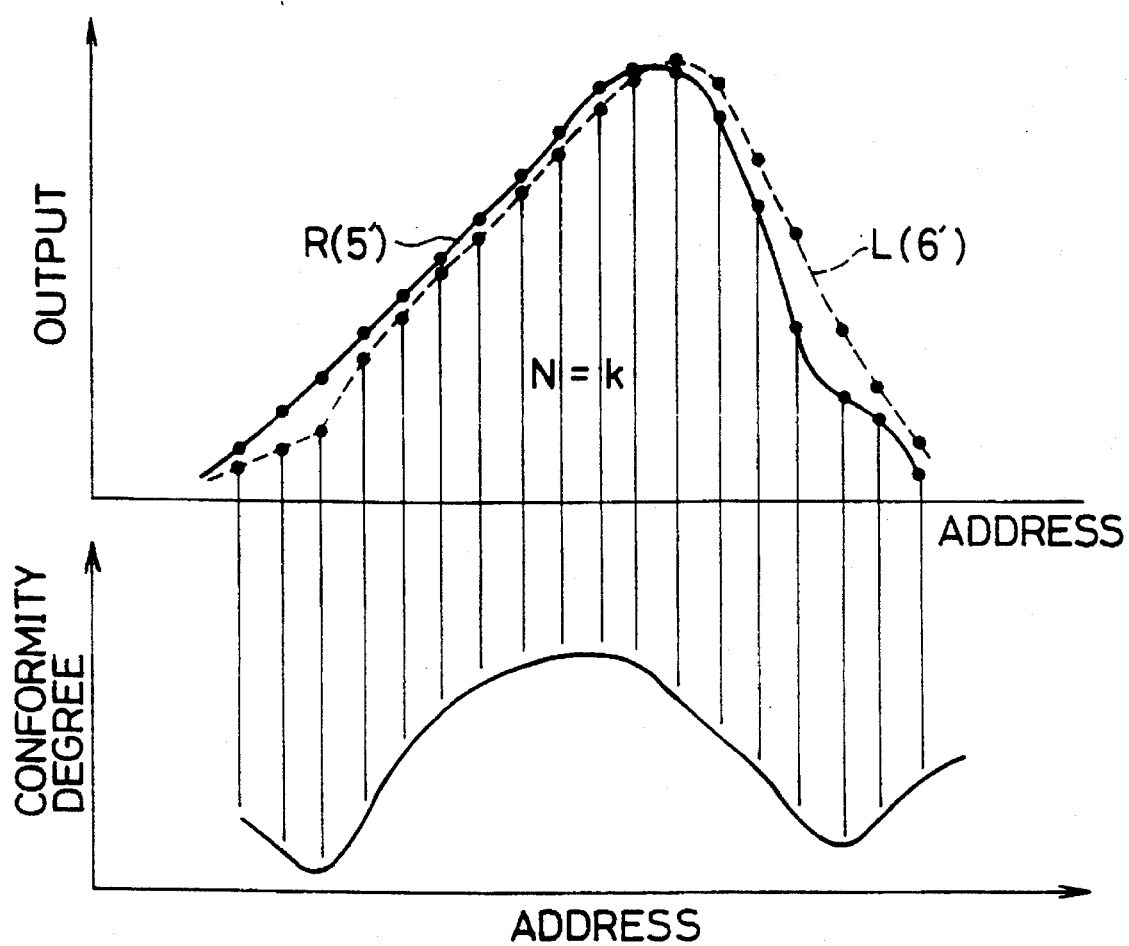
FIG. 6 is a waveform diagram showing the correlation between a conformity degree and an output waveform of the pair of light-receiving element arrays shown in FIG. 1.

As shown in FIG. 6, all or a portion of a region of each of the image information 5' and 5' is divided into a high conformity degree portion QH and a low conformity degree portion QL with respect to a conformity degree between the two image information 5' and 6'. A distance of the photographed object is calculated by using a large weight with respect to the high conformity degree portion QH.

For example, the following formula is calculated as a general constructional example.

$$\Delta T = \{\Sigma\ (QI \cdot \Delta tI)\}/\{\Sigma QI\}$$

In this formula, $\Delta T$ is an image shifting amount in entire electric processing of the two image information 5' and 6'. $\Delta tI$ is an image shifting amount in electric processing every certain portion of the two image information 5' and 6'. QI is a conformity degree every certain portion in the two image information 5' and 6'.

The conformity degree QI every certain portion calculated in this calculating formula is set to a parameter so as to calculate a weighted mean thereof. The distance of the photographed object is calculated by using a larger weight with respect to the image shifting amount $\Delta tI$ calculated from image information providing a higher conformity degree.

In this construction, when a certain noise is added to the two image information 5' and 6', the conformity degree between the two image information 5' and 6' is reduced in an image information portion including this noise so that this image information portion is calculated by using a relatively small (or low) weight. Accordingly, when such a calculating method is used, the distance of the photographed object is calculated by using a large weight in a high conformity degree portion between the two image information 5' and 6', but is calculated by using a small weight according to a low conformity degree in a low conformity degree portion between the two image information 5' and 6'. Thus, it is possible to improve reliability of the image shifting amount ΔT as data in entire electric processing of the two image information 5' and 6'.

Figure 7:
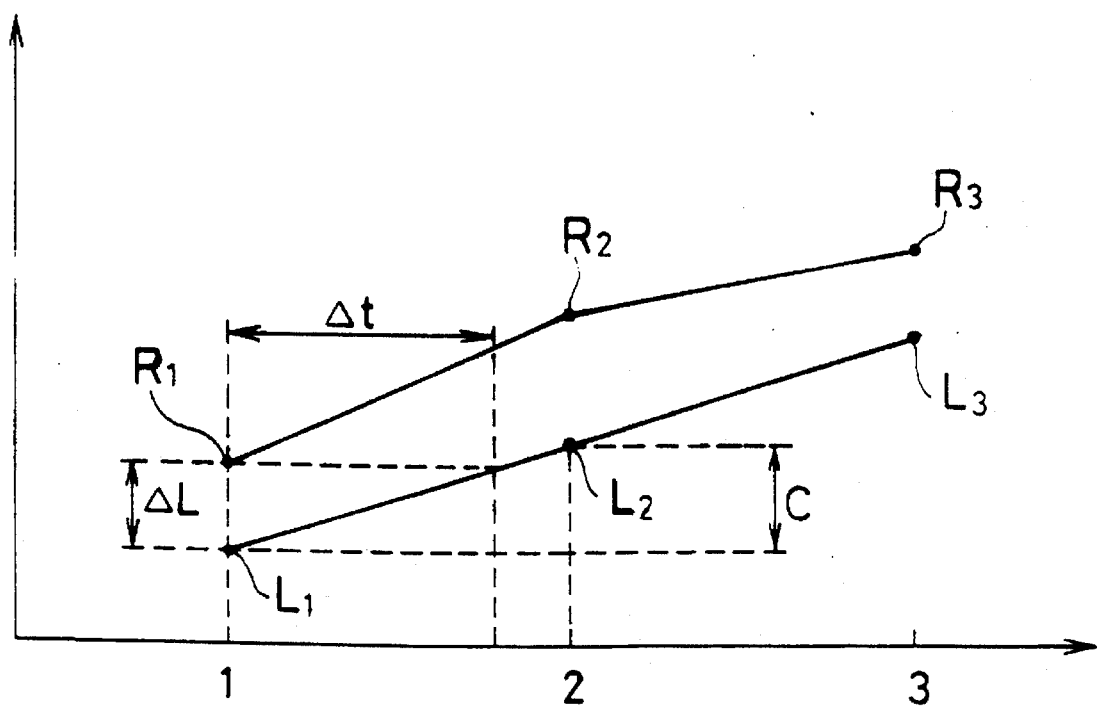
FIG. 7 is a waveform diagram showing the correlation of output waveforms of the pair of light-receiving element arrays shown in FIG. 1 in an address unit.

With respect to the conformity degree QI every certain portion, the two image information 5' and 6' are relatively shifted from each other as shown in FIG. 6. At this time, a point N=k providing a high conformity degree of the two image information 5' and 6' is discretely calculated by using a normal correlational method. At this time, when the two image information 5' and 6' overlap each other as shown in FIG. 7, conformity points of image data are compared with each other every two points such as ($L_1$, $L_2$) and ($R_1$, $R_2$); ($L_2$, $L_3$) and ($R_2$, $R_3$); - - - . In this comparison, the conformity degree is increased as inclinations of curves of the two image data approach the same inclination. For example, a high conformity degree is provided when the inclination of a curve provided by $L_1$ and $L_2$ is parallel to that provided by $R_1$ and $R_2$. In this case, the conformity degree Q is equal to CL/CH when CL and CH are set to inclinations.

The inclination CL is a smaller inclination with respect to inclinations of $L_2$–$L_1$ and $R_2$–$R_1$ or inclinations of $L_3$–$L_2$ and $R_3$–$R_2$. The inclination CH is a larger inclination with respect to the inclinations of $L_2$–$L_1$ and $R_2$–$R_1$ or the inclinations of $L_3$–$L_2$ and $R_3$–$R_2$.

In this formula Q=CL/CH, CL=CH and Q=1 are formed when the two image data are in conformity with each other. In this case, the two image data overlap each other. Q approaches zero as the conformity degree between the two image data is reduced. Q is assumed to be zero when signs of CL and CH are reverse to each other. In this case, Q is set to a parameter showing conformity and is ranged from 0 to 1.

As shown in FIG. 7, a point shown by $R_1$ overlaps a curve shown by $L_1$ and $L_2$ by shifting this point by a distance ΔtI. Since Δt=ΔL/C is formed, ΔtI is provided as follows.

$$\Delta tI=(R_1-L_1)/(L_2-L_1)$$

If the following formula, $$\Delta T=\{\Sigma\ (QI\cdot\Delta tI)\}/\{\Sigma QI\}$$

is calculated by using these ΔtI, QI, etc. every one point of the two image information, the distance of the photographed object can be calculated by providing a weight to information at a high conformity degree point.

FIG. 1 shows a concrete structure for making various kinds of calculations in the above conceptional explanation. This structure is constructed by five kinds of arithmetic circuits composed of an integral part shifting arithmetic circuit 9, a decimal part arithmetic circuit 10, a weighting arithmetic circuit 11, a shifting amount arithmetic circuit 12 and a focusing-driving amount arithmetic circuit 13.

An output section of the focusing-driving amount arithmetic circuit 13 is connected to a focusing-driving control circuit 14. A focusing-driving lens constituting the photographing lens 2 is moved by an output of this focusing-driving control circuit 14 such that this focusing-driving lens is focused to set a focusing state thereof.

Concrete arithmetic procedures of these circuits will next be explained with reference to flow charts shown in FIGS. 8 to 15.

Figure 8:
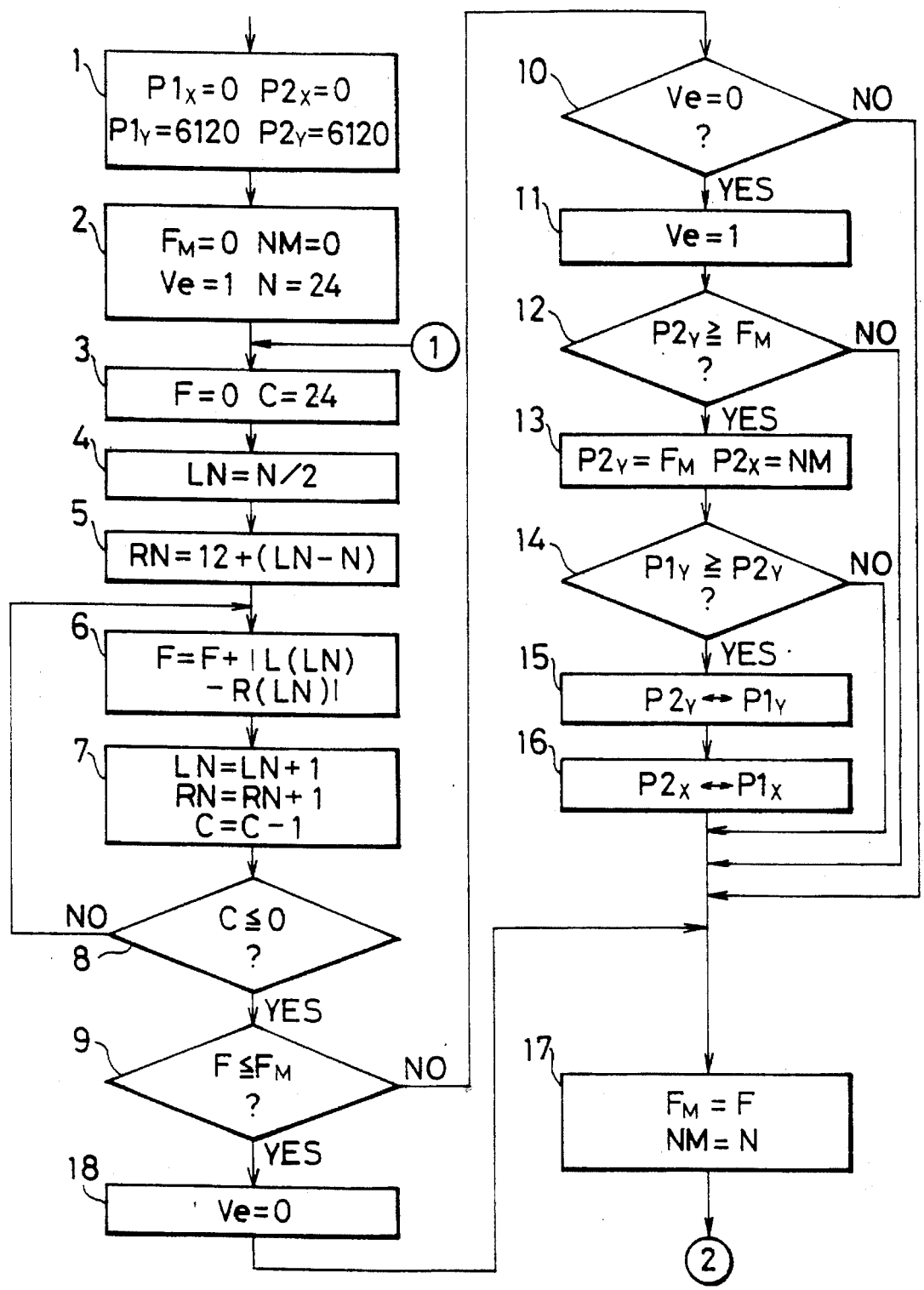
FIG. 8 is a flow chart showing the operation of an arithmetic circuit section shown in FIG. 1.
Figure 9:
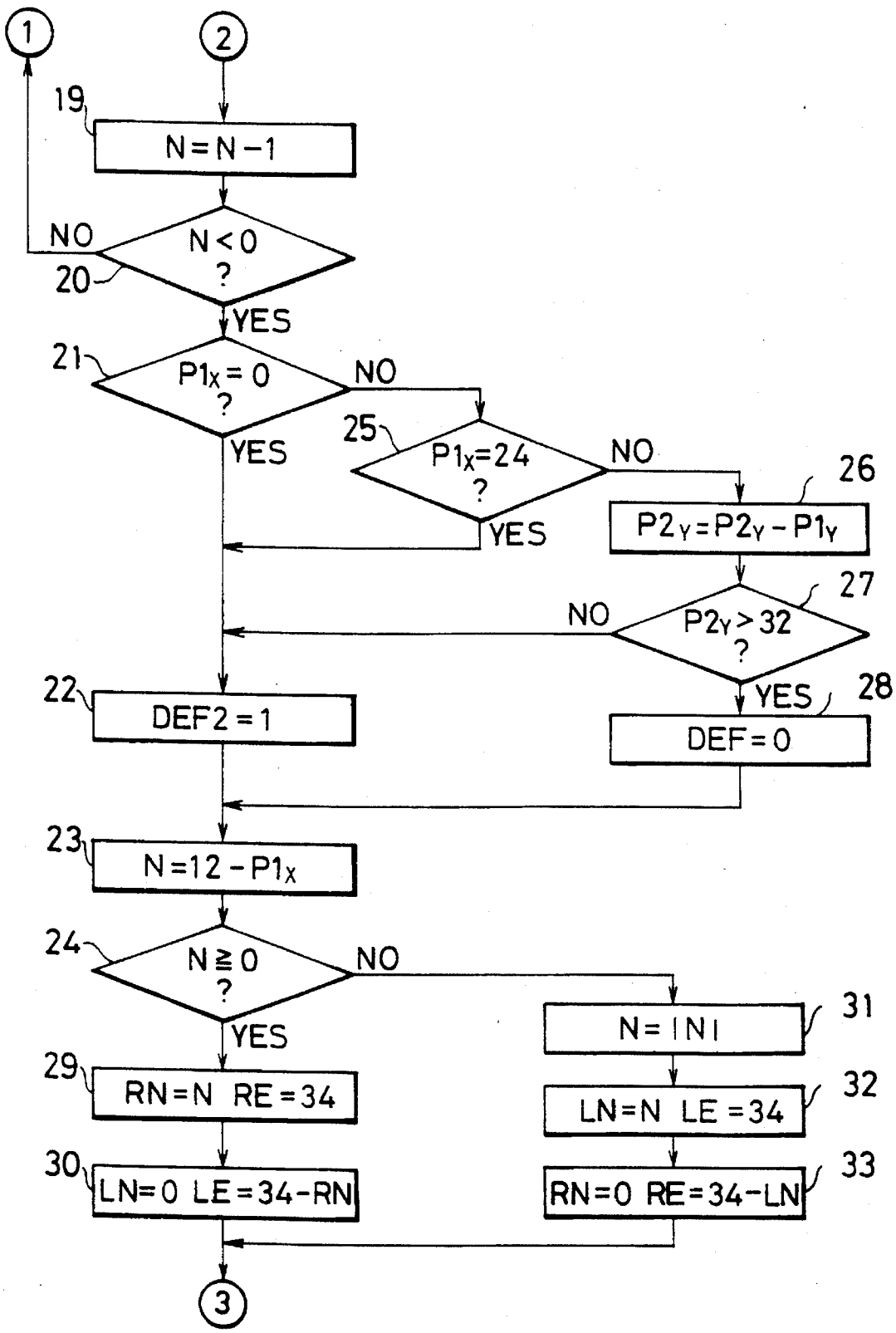
FIG. 9 is a flowchart about processing steps subsequent to the flow chart shown in FIG. 8.

In an operation of the integral part shifting arithmetic circuit 9, a local minimum value shown by reference numeral x in FIG. 5 is calculated in a step #1 shown in FIG. 8. In the following description, step # is briefly called #. Addresses at a first local minimum x-coordinate $P1_X$ and a second local minimum x-coordinate $P2_X$ are constructed by values 0 to 24 of 8 bits and are respectively set to zero to calculate the above local minimum value x. A first local minimum value $P1_Y$ and a second local minimum value $P2_Y$ are constructed by values 0 to 6120 of 15 bits and are set to a maximum value 6120.

The first local minimum value $P1_Y$ is a first smallest local minimum value and the second local minimum value $P2_Y$ is a second smallest local minimum value. X-coordinates at these local minimum values $P1_Y$ and $P2_Y$ are respectively set to the first local minimum x-coordinate $P1_X$ and the second local minimum x-coordinate $P2_X$.

In the next step #2, a local minimum value $F_M$ evaluated as a minimum is constructed by values 0 to 6120 of 16 bits and is set to zero. Further, an evaluated minimum shifting value NM is constructed by values 0 to 24 of 8 bits and is set to zero as a minimum. Further, an up-down vector Ve is constructed by values 0 (down) and 1 (up) of 16 bits and a value of this up-down vector Ve is set to one.

This up-down vector Ve corresponds to "1" meaning an up vector when the value of this up-down vector is increased. The up-down vector Ve corresponds to "0" meaning a down vector when the value of this up-down vector is decreased. In the step #2, a shifting amount N is constructed by values 0 to 24 of 8 bits and is set to 24 as a maximum.

In the next step #3, an evaluated result F is constructed by values 0 to 6120 of 16 bits and is set to zero as a minimum. The counting number of a counting register C is constructed by values 0 to 24 of 8 bits and is set to 24 as a maximum.

In the next step #4, an address LN as one address of the left-hand light-receiving elements $L_1$ to $L_n$ shown in FIG. 2 is constructed by values 0 to 36 of 8 bits and is set to ½ times the shifting amount N.

In the next step #5, an address RN as one address of the right-hand light-receiving elements $R_1$ to $R_n$ shown in FIG. 2 is constructed by values 0 to 36 of 8 bits and is set to 12+LN–N. In the next step #6, F=F+|L(LN)–R(LN)| is calculated. Then, it proceeds to the next step #7.

In the step #7, the address LN as one address of the light-receiving elements $L_1$ to $L_n$ and the address RN as one address of the light-receiving elements $R_1$ to $R_n$ are increased by one in a counting operation. Further, the counting number of the counting register C is increased by –1. Namely, the counting number of the counting register C is decreased by one.

In the next step #8, it is judged whether C≦0 is formed or not with respect to the counting register C. When this judgment in the step #8 is NO, it is returned to the step #6 so that the steps #6 and #7 are again executed. In contrast to this, when this judgment in the step #8 is YES, it proceeds to the next step #9.

In this step #9, the evaluated result F is compared with the evaluated minimum $F_M$. When F≦$F_M$ is formed so that the judgment in this step #9 is NO, it proceeds to a step #10. In this step 10, it is judged whether the up-down vector Ve shows "0" or not. When this up-down vector Ve shows "1" indicating an up vector so that the judgment in this step #10 is NO, it proceeds to a step #17. In this step #17, the evaluated minimum $F_M$ is set to the evaluated result F and the evaluated minimum shifting value NM is set to the shifting amount N.

In contrast to this, when the judgment in the step #10 is YES, the up-down vector Ve shows "0" meaning a down vector. In this case, it proceeds to a step #11. In this step #11, the value of the up-down vector Ve is changed to "1". In the next step #12, it is judged whether $P2_Y \geq F_M$ is formed or not in the relation between the second local minimum value $P2_Y$ and the evaluated minimum $F_M$.

When this judgment in the step #12 is YES, it proceeds to the next step #13. In this step #13, the second local minimum value $P2_Y$ is set to the evaluated minimum $F_M$ and the second local minimum value x-coordinate $P2_X$ is set to the evaluated minimum shifting value NM. Then, it proceeds to the next step #14.

In this step #14, it is judged whether $P1_Y \geq P2_Y$ is formed or not in the relation between the first local minimum value $P1_Y$ and the second local minimum value $P2_Y$. When this judgment in the step #14 is NO, it proceeds to the step #17 mentioned above. In contrast to this, when this judgment in the step #14 is YES, it proceeds to the next step #15. In this step #15, first and second smallest values of each of the first local minimum value $P1_Y$ and the second local minimum value $P2_Y$ are stored to a memory.

In the next step #16, x-coordinate values corresponding to these first and second smallest values are respectively stored to the memory as a first local minimum x-coordinate $P1_X$ and a second local minimum value coordinate $P2_X$.

When the judgment in the above step #12 is NO, the evaluated minimum $F_M$ is larger than the second local minimum value $P2_Y$. In this case, it proceeds to the step #17. In this step #17, the evaluated minimum $F_M$ is set to the evaluated result F and the evaluated minimum shifting value NM is set to the shifting amount N.

When the judgment in the above step #9 is YES, the evaluated result F is equal to or smaller than the evaluated minimum $F_M$. In this case, it proceeds to a step #18. In this step #18, the value of the up-down vector Ve is set to "0" so that the up-down vector Ve is changed to a down vector. Then, it proceeds to the step #17.

When the steps #1 to #18 are executed as mentioned above, it proceeds to a step #19 shown in FIG. 9 through a junction point ② shown in FIG. 8. In this step #19, the shifting amount N is decreased by one. In other words, the shifting amount N set to 24 as an address value in the above step #2 shown in FIG. 8 is changed to 23 and it proceeds to the next step #20.

In the step #20, it is judged whether the shifting amount N is negative or not. When this judgment in the step #20 is NO, it is returned to the above step #3 shown in FIG. 2 through a junction point ① so that processings subsequent to this step #3 are again executed.

In contrast to this, when the judgment in the step #20 is YES, it proceeds to the next step #21. In this step #21, it is judged whether the first local minimum x-coordinate $P1_X$ is equal to zero or not. When this judgment in the step #21 is YES, it proceeds to the next step #22. In this step #22, a distance measuring disable flag DEF is set to "1" and it proceeds to the next step #23.

In this step #23, the shifting amount N set to the evaluated minimum shifting value NM in the step #17 is stepped from 12 by a value of the first local minimum x-coordinate $P1_X$ equal to an integral value. Then, it proceeds to the next step #24.

When the judgment in the above step #21 is NO, it proceeds to a step #25. In this step #25, it is judged whether the value of the first local minimum value coordinate $P1_X$ is equal to 24 or not. When this judgment in the step #25 is YES, it proceeds to the step #22. In contrast to this, when this judgment in the step #25 is NO, it proceeds to a step #26. In this step #26, the first local minimum value $P1_Y$ is subtracted from the second local minimum value $P2_Y$ and it proceeds to the next step #27. In this step #27, it is judged whether the subtracted value exceeds 32 or not. When this judgment in the step #27 is YES, it proceeds to the next step #28. In this step #28, the distance measuring disable flag DEF is set to "0" and it is then returned to the step #23.

An output value of this distance measuring disable flag DEF is set to "1" when no distance measuring operation can be normally performed, or when there is a high possibility that no normal calculated results can be obtained as expected results. In contrast to this, the output value of the distance measuring disable flag DEF is set to "0" when the distance measuring operation can be reliably performed.

Namely, the output value of the distance measuring disable flag DEF is set to "1" when an address at a detected minimum value is equal to an abnormal value at a terminal point such as 24, 0, etc., or when the difference between the first local minimum value $P1_Y$ and the second local minimum value $P2_Y$ is small.

In contrast to this, when the judgment in the step #27 is NO, the second local minimum value $P2_Y$ is equal to or lower than 32. In this case, it is returned to the step #22. In this step #22, the distance measuring disable flag DEF is set to "1".

In the above step #24, it is judged whether or not the shifting amount N set in the step #23 is equal to or greater than zero. When this judgment in the step #24 is YES, it proceeds to the next step #29. In this step #29, an address RN as one address of the light-receiving elements $R_1$ to $R_n$ is set to a value (N=12−$P1_X$) set in the above step #23. Simultaneously, an end address RE of the light-receiving elements $R_1$ to $R_n$ is stepped and set to 34. Then, it proceeds to the next step #30.

In this step #30, an address LN as one address of the light-receiving elements $L_1$ to $L_n$ is set to zero. Further, an end address LE of the light-receiving elements $L_1$ to $L_n$ is set to a value obtained by subtracting the address RN of the light-receiving elements $R_1$ to $R_n$ from 34 set in the step #29.

In contrast to this, when the judgment in the above step #24 is NO, it proceeds to a step #31. In this step #31, the shifting amount N is changed to an absolute value of the shifting amount N set in the step #23. In the next step #32, the address LN of the light-receiving elements $L_1$ to $L_n$ is changed to the value set in the step #31. Further, the end address LE of the light-receiving elements $L_1$ to $L_n$ is stepped and set to 34. Then, it proceeds to the next step #33.

In this step #33, the address RN of the light-receiving elements $R_1$ to $R_n$ is set to zero. Further, the end address RE of the light-receiving elements $R_1$ to $R_n$ is set to a value obtained by subtracting the address LN of the light-receiving elements $L_1$ to $L_n$ from 34 set above.

Operations in the above steps #24 and #29 to #33 are summarized as follows. Namely, LN is set to an offset value on an L-side and RN is set to an offset value on an R-side to overlap data of the left-hand light-receiving elements $L_1$ to $L_n$ and the right-hand light-receiving elements $R_1$ to $R_n$ at a minimum value calculated by an integral part and a shifting calculation before a decimal part described later is calculated. Further, RE and LE are set to terminal values to overlap the above data of the left-hand light-receiving elements $L_1$ to $L_n$ and the right-hand light-receiving elements $R_1$ to $R_n$.

Namely, R(RN) and L(LN) as first addresses are compared with each other. The next addresses R(RN+1) and L(LN+1) are then compared with each other. Similarly, R(RE) and L(RE) as final addresses are compared with each other. These comparing operations are performed to calculate a decimal part described later.

The processing operations in the above #1 to #33 are repeatedly executed so that the operation of the integral part shifting arithmetic circuit 9 shown in FIG. 1 is completed. Thus, it proceeds to the next step #41 shown in FIG. 10 through a junction point ③ shown in FIG. 9.

In the step #41, a maximum contrast $C_{MAX}$ is constructed by values 0 to 255 of 8 bits and is set to a minimum value 0. Further, each of a plus interpolating value AFP and a minus interpolating value AFM is constructed by values 0 to ±255×255×35 of 24 bits and is set to a minimum value 0. Further, each of a plus weight QCP and a minus weight QCM is constructed by values 0 to ±255×255×35 of 24 bits and is set to a minimum value 0. After such initializing operations have been performed, it proceeds to the next step #42.

In this step #42, it is judged whether L(LN)<R(RN)<L(LN+1) is formed or not. When this judgment in the step #42 is YES, it proceeds to the next step #44.

In contrast to this, when this judgment in the step #42 is NO, it proceeds to a step #43. In this step #43, it is judged whether L(LN)>R(RN+1)>L(LN+1) is formed or not. When this judgment in the step #43 is YES, it proceeds to the step #44. In contrast to this, when this judgment in the step #43 is NO, it proceeds to a step #46 after a step #45.

In this step #44, a differential output D constructed by values ±255 of 8 bits is obtained by a difference in output between each of the light-receiving elements $L_1$ to $L_n$ and each of the light-receiving elements $R_1$ to $R_n$. This differential output D is calculated as R(RN)−L(LN). Further, a first contrast value $C_1$ constructed by values ±255 of 8 bits is calculated as L(LN+1)−L(LN). Similarly, a second contrast value $C_2$ constructed by values ±255 of 8 bits is calculated as R(RN+1)−R(RN).

After the differential output D, the first contrast value $C_1$ and the second contrast value $C_2$ have been obtained in this step #44, it proceeds to a step #45. In this step #45, an interpolating calculation is made. Detailed contents of this interpolating calculation will next be explained with reference to FIGS. 13 to 15.

The first contrast value $C_1$ can be set to three values composed of zero, a positive value and a negative value. In a step #62 shown in FIG. 13, it is judged whether the first contrast value $C_1$ is equal to zero, a positive value or a negative value. When $C_1=0$ is formed in this step #62, there is no contrast of an image so that no decimal part can be calculated in this image contrast portion (but an integral part can be calculated). Therefore, it proceeds to a returning step #68 so that it proceeds to the step #46 without making the interpolating calculation in this contrast portion.

In contrast to this, when the first contrast value $C_1$ is greater than zero ($C_1>0$) in the step #62, it proceeds to a step #63. In the step #63, it is judged whether or not the second contrast value $C_2$ is greater than zero ($C_2>0$). When this judgment in the step #63 is NO, signs of the first contrast value $C_1$ and the second contrast value $C_2$ are reverse to each other so that no interpolating calculation can be made in this image contrast portion (but an integral part can be calculated). Therefore, it proceeds to the returning step #68 so that it proceeds to the step #46 without making the interpolating calculation in this contrast portion.

In contrast to this, when the judgment in the step #63 is YES, the signs of the first contrast value $C_1$ and the second contrast value $C_2$ are equal to each other so that the interpolating calculation can be made. Therefore, it proceeds to the next step #64. In the step #64, the first contrast value $C_1$ and the second contrast value $C_2$ are compared with each other. Namely, in this step #64, it is judged whether $C_1 \geq C_2$ is formed or not. When this judgment in the step #64 is YES, it proceeds to a step #65. In this step #65, the plus interpolating value AFP is set to AFP+$DC_2$. In the next step #66, the plus weight QCP is set to QCP+$C_1C_2$ and is stored to a memory. Then, it proceeds to a step #67.

As mentioned above, in the step #64, it is judged whether $C_1 \geq C_2$ is formed or not. When this judgment in the step #64 is NO, processings in steps #70 to #77 shown in FIG. 14 are executed.

Figure 14:
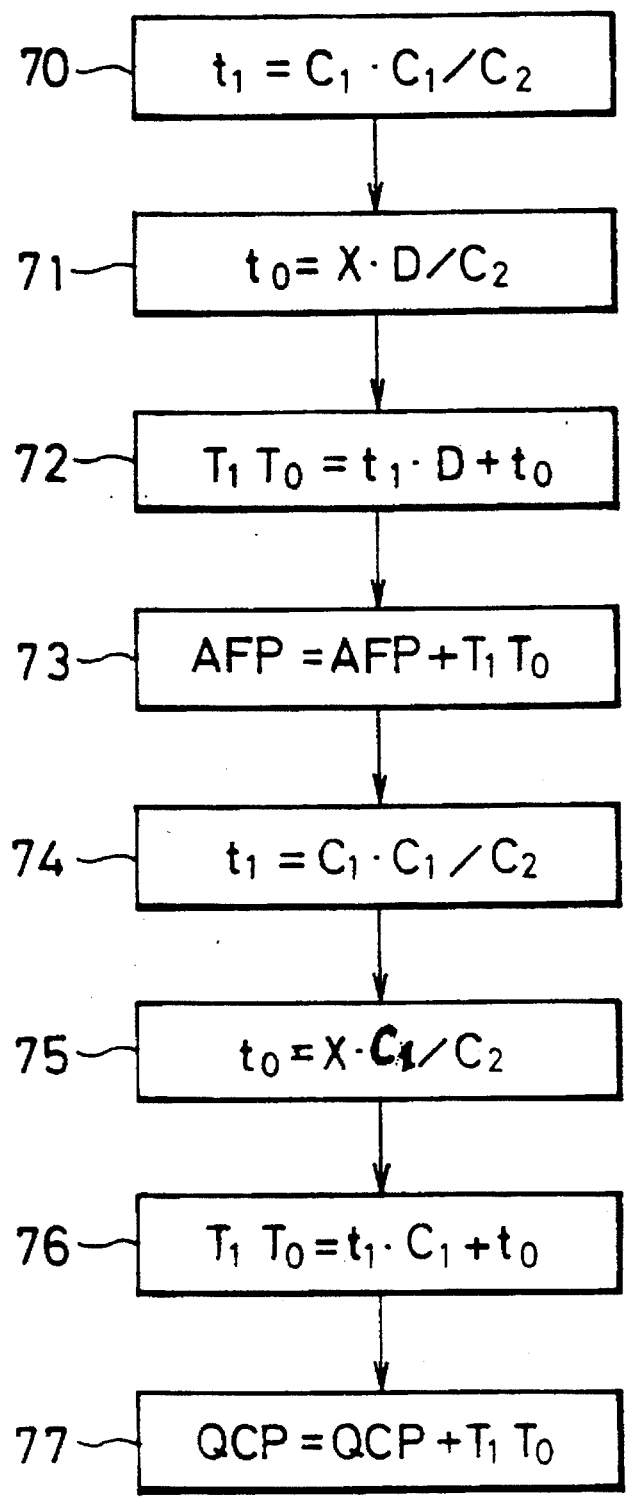
FIG. 14 is a flow chart showing one detailed portion of the interpolating operation of the detector shown in FIG. 13.

As shown in FIG. 14, in the first step #70, a correction value $t_1$ is calculated as follows.

$$t_1 = C_1C_1/C_2$$

In the next step #71, a subcorrection value $t_0$ is calculated as follows.

$$t_0 = XD/C_2$$

X in this formula is a remaining value obtained by the divisional calculation in the step #70.

In a step #72, $T_1T_0 = t_1D + t_0$ is calculated from the calculated results of the main correction amount $t_1$ in the step #70 and the subcorrection amount $t_0$ in the step #71. In the next step #73, the plus interpolating value AFP is set to AFP+$T_1T_0$ and it proceeds to the next step #74. In the step #74, $t_1 = C_1C_1C_2$ is calculated. In the next step #75, the subcorrection amount $t_0$ is calculated as $t_0 = XC_1/C_2$. In this case, X is a remaining value obtained by the divisional calculation in the step #74.

In the next step #76, $T_1T_0 = t_1C_1 + t_0$ is calculated from the calculated results of the main correction amount in the step #74 and the subcorrection amount in the step #75. In the next step #77, a plus weight QCP is set to QCP+$T_1T_0$ and it is returned to the step #67 in FIG. 13.

Figure 13:
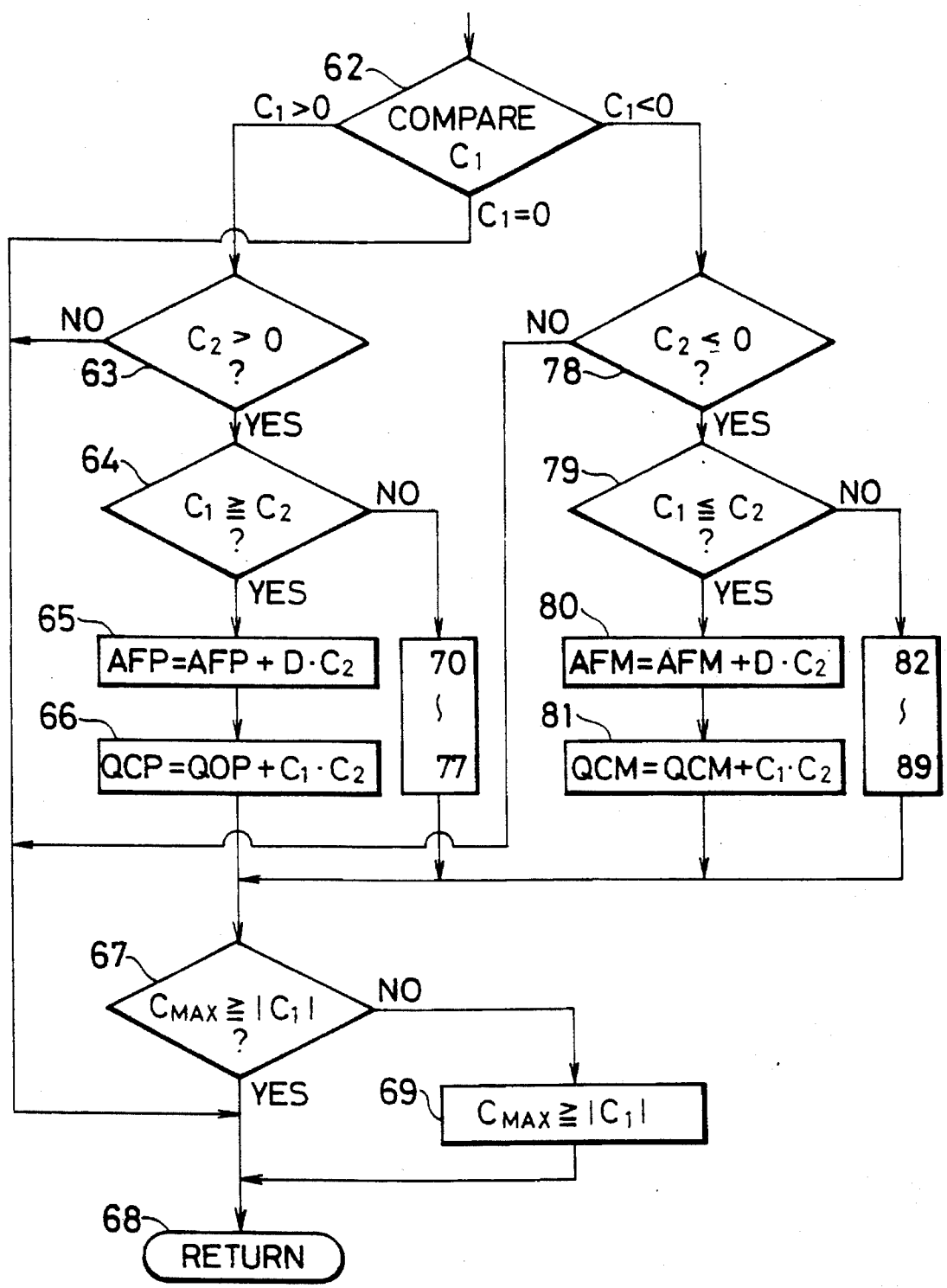
FIG. 13 is a flow chart showing a subroutine indicative of a detailed operation for making an interpolating calculation shown in FIG. 10.

In FIG. 13, when the first contrast value $C_1$ is smaller than zero ($C_1<0$) in the step #62, it proceeds to a step #78. In the step #78, it is judged whether the second contrast value $C_2$ is smaller than zero ($C_2<0$). When this judgment in the step #78 is NO, signs of the first contrast value $C_1$ and the second contrast value $C_2$ are reverse to each other so that no interpolating calculation can be made in this image contrast portion (but an integral part can be calculated). Therefore, it proceeds to the returning step #68 so that it proceeds to the step #46 without making the interpolating calculation in this contrast portion.

In contrast to this, when the judgment in the step #78 is YES, the signs of the first contrast value $C_1$ and the second contrast value $C_2$ are equal to each other so that a decimal part can be calculated. Therefore, it proceeds to the next step #79. In this step #79, the first contrast value $C_1$ is compared with the second contrast value $C_2$. Namely, in the step #79, it is judged whether $C_1 \leq C_2$ is formed or not. When the judgment in this step #79 is YES, it proceeds to a step #80. In this step #80, the minus interpolating value AFM is set to AFM+$DC_2$. In the next step #81, the minus weight QCM is set to QCM+$C_1C_2$ and is stored to a memory. Then, it proceeds to the step #67.

As mentioned above, in the step #79, it is judged whether $C_1 \leq C_2$ is formed or not. When this judgment in the step #79 is NO, processings in steps #82 to #89 shown in FIG. 15 are executed.

Figure 15:
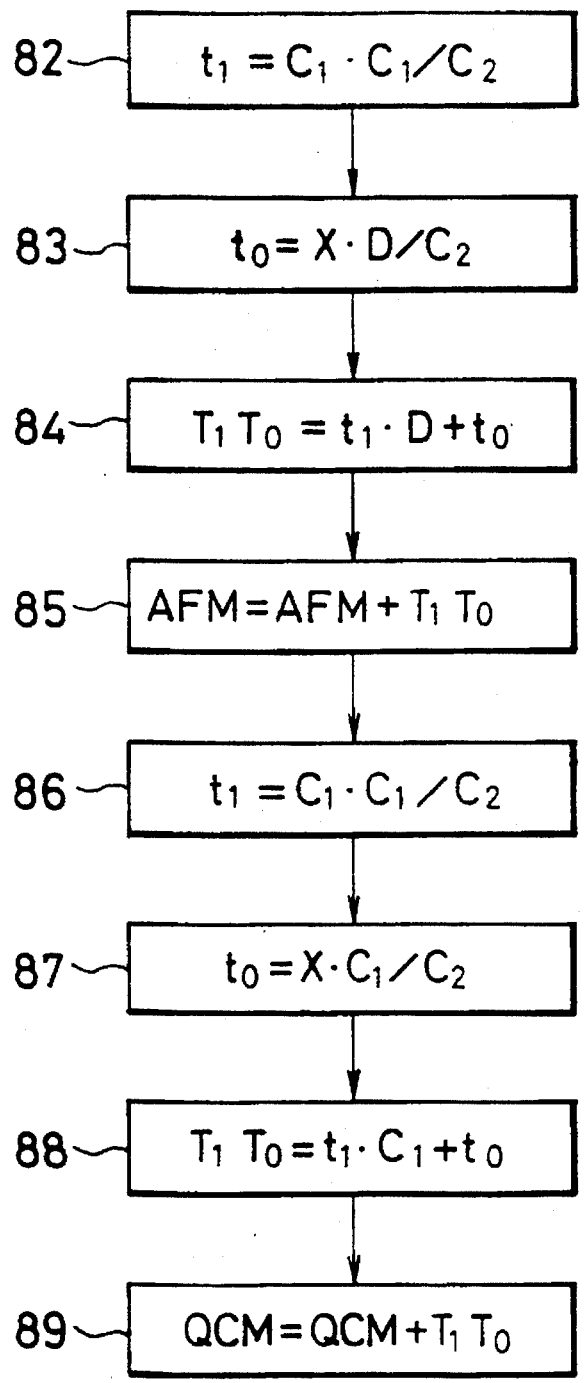
FIG. 15 is a flow chart showing one detailed portion of the interpolating operation of the detector shown in FIG. 13.

As shown in FIG. 15, in the first step #82, a main correction value $t_1$ is calculated as follows.

$$t_1 = C_1C_1/C_2$$

In the next step #83, a subcorrection value $t_0$ is calculated as follows.

$$t_0 = XD/C_2$$

X in this formula is a remaining value obtained by the divisional calculation in the step #82.

In a step #84, $T_1T_0=t_1D+t_0$ is calculated from the calculated results of the main correction amount $t_1$ in the step #82 and the subcorrection amount $t_0$ in the step #83. In the next step #85, the minus interpolating value AFM is set to $AFM+T_1T_0$ and it proceeds to the next step #86. A calculation in this step #86 is similar to that in the above step #82. In the next step #87, the subcorrection amount $t_0$ is calculated as $t_0=XC_1/C_2$. In this case, X is a remaining value obtained by the divisional calculation in the step #86.

In the next step #88, $T_1T_0=t_1C_1+t_0$ is calculated from the calculated results of the main correction amount in the step #86 and the subcorrection amount in the step #87. In the next step #89, the minus weight QCM is set to $QCM+T_1T_0$ and it is returned to the step #67 in FIG. 13.

In this step #67, it is judged whether $C_{MAX} \geq |C_1|$ about the maximum contrast $C_{MAX}$ and the first contrast value $C_1$ is formed or not. When this judgment in the step #67 is YES, it proceeds to the returning step #68. In contrast to this, when this judgment in the step #67 is NO, the value of the maximum contrast $C_{MAX}$ is rewritten to the value of the first contrast $C_1$ and it proceeds to the returning step #68.

The above calculations in the steps #71 and #75 shown in FIG. 14 and the steps #83 and #87 shown in FIG. 15 are made to calculate an accurate interpolating value in consideration of the remaining value of each of the divisional results calculated in the above steps #70 and #74 shown in FIG. 14 and the above steps #82 and #86 shown in FIG. 15.

Figure 10:
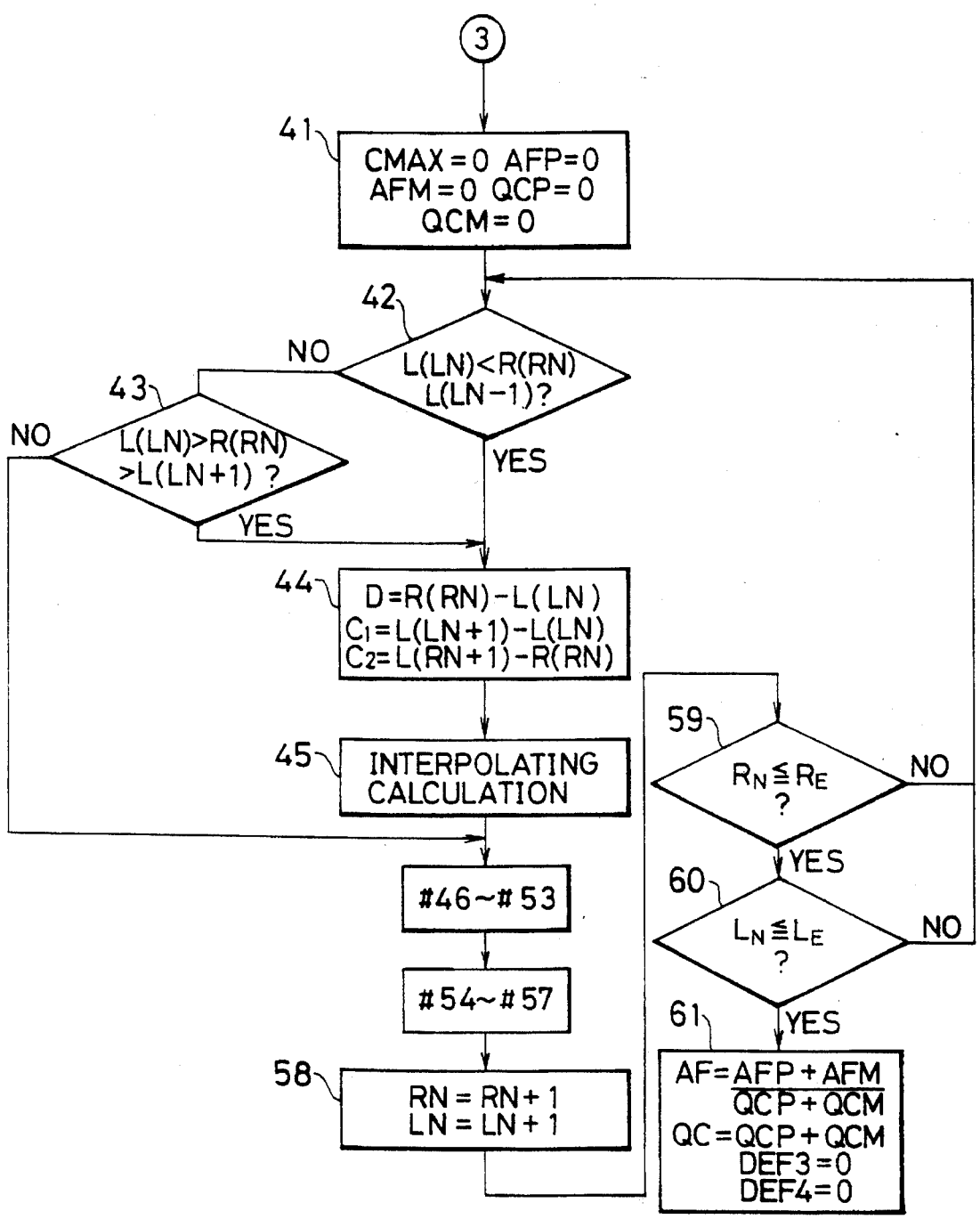
FIG. 10 is a flow chart about processing steps subsequent to the flow chart shown in FIG. 9.
Figure 11:
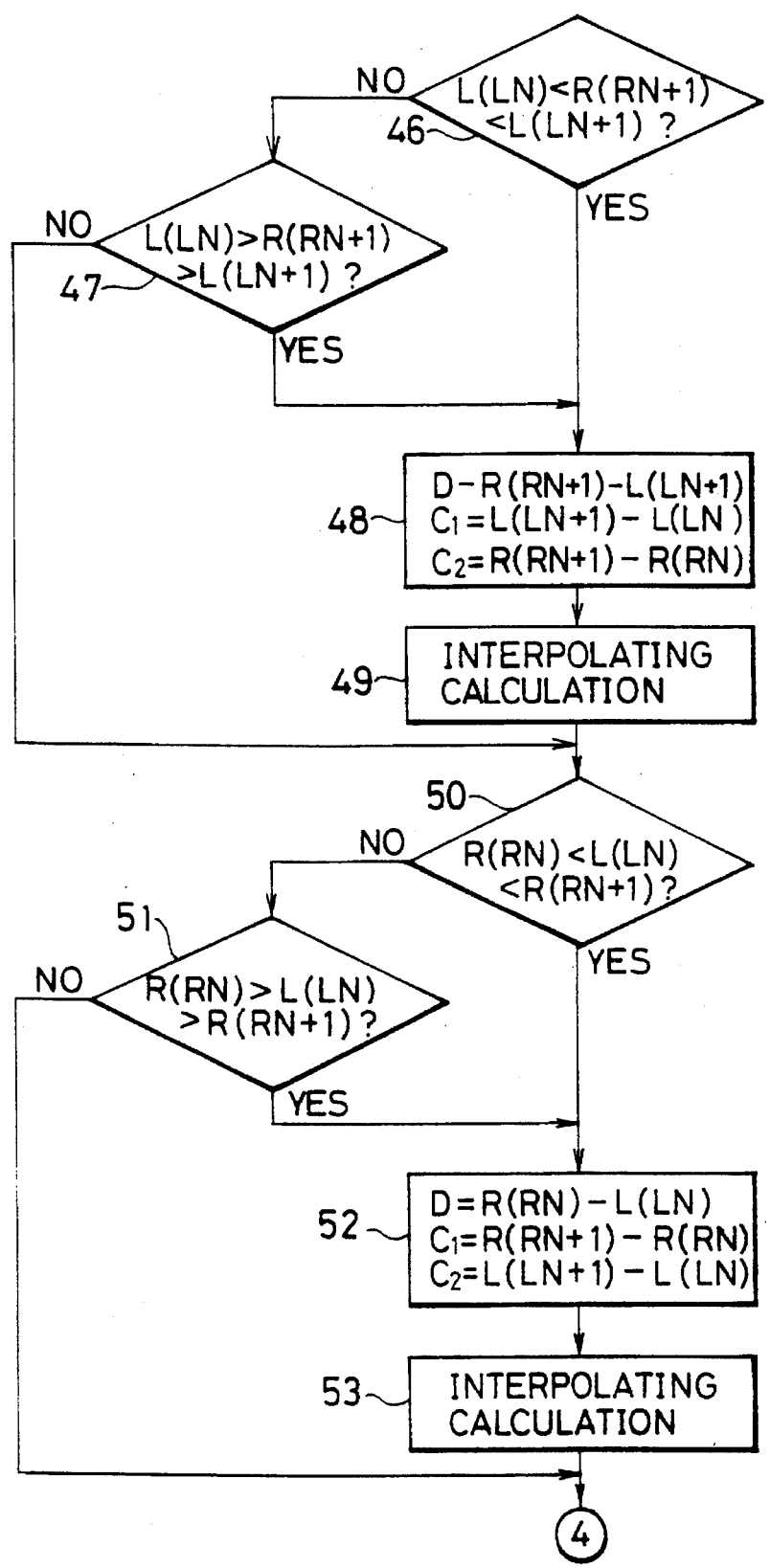
FIG. 11 is a flow chart showing detailed processing contents in processing steps #46 to #53 in the flow chart shown in FIG. 10.

The interpolating calculation in the step #45 shown in FIG. 10 is thus made with reference to FIGS. 13 to 15 so that it is returned to subsequent processing steps shown in FIG. 10. After the interpolating calculation in the step #45 has been completely made, it proceeds to three groups of sequential steps #46 to #49, #50 to #53, and #54 to #57. These three step groups will next be described in detail. First, the group of steps #46 to #49 will be explained with reference to FIG. 11.

In the step #46, it is judged whether L(LN)<(R(RN+1)<L(LN+1) is formed or not. When this judgment in the step #46 is YES, it proceeds to the next step #48.

In contrast to this, when the judgment in the step #46 is NO, it proceeds to a step #47. In this step #47, it is judged whether L(LN)>R(RN+1)>L(LN+1) is formed or not. When this judgment in the step #47 is YES, it proceeds to the step #48. In contrast to this, when this judgment in the step #47 is NO, it proceeds to a step #50 after a step #49.

In the step #48, a differential output D constructed by values ±255 of 8 bits is obtained by a difference in output between each of the light-receiving elements $L_1$ to $L_n$ and each of the light-receiving elements $R_1$ to $R_n$ and is calculated as R(RN+1)–L(LN+1). Further, the first contrast value $C_1$ is calculated as L(LN+1)–L(LN). Further, the second contrast value $C_2$ is calculated as R(RN+1)–R(RN).

After the differential output D, the first contrast value $C_1$ and the second contrast value $C_2$ are obtained in this step #48, it proceeds to the step #49. In this step #49, an interpolating calculation similar to that in the above step #45 explained with reference to FIGS. 13 to 15 is made.

In the step #50 after the step #49, it is judged whether R(RN)<L(LN)<R(RN+1) is formed or not. When this judgment in the step #50 is YES, it proceeds to the next step #52.

In contrast to this, when the judgment in the step #50 is NO, it proceeds to a step #51. In this step #51, it is judged whether R(RN)>L(LN)>R(RN+1) is formed or not. When this judgment in the step #51 is YES, it proceeds to the step #52. In contrast to this, when the judgment in the step #51 is NO, it proceeds to a step #54 after a step #53 (see FIG. 12).

In the step #52, a differential output D is obtained by a difference in output between each of the light-receiving elements $L_1$ to $L_n$ and each of the light-receiving elements $R_1$ to $R_n$ and is calculated as R(RN)–L(LN). Further, the first contrast value $C_1$ is calculated as R(RN+1)–R(RN). Further, the second contrast value $C_2$ is calculated as L(LN+1)–L(LN).

After the differential output D, the first contrast value $C_1$ and the second contrast value $C_2$ are obtained in this step #52, it proceeds to the step #53. In this step #53, an interpolating calculation similar to that in the above step #45 explained with reference to FIGS. 13 to 15 is made.

Figure 12:
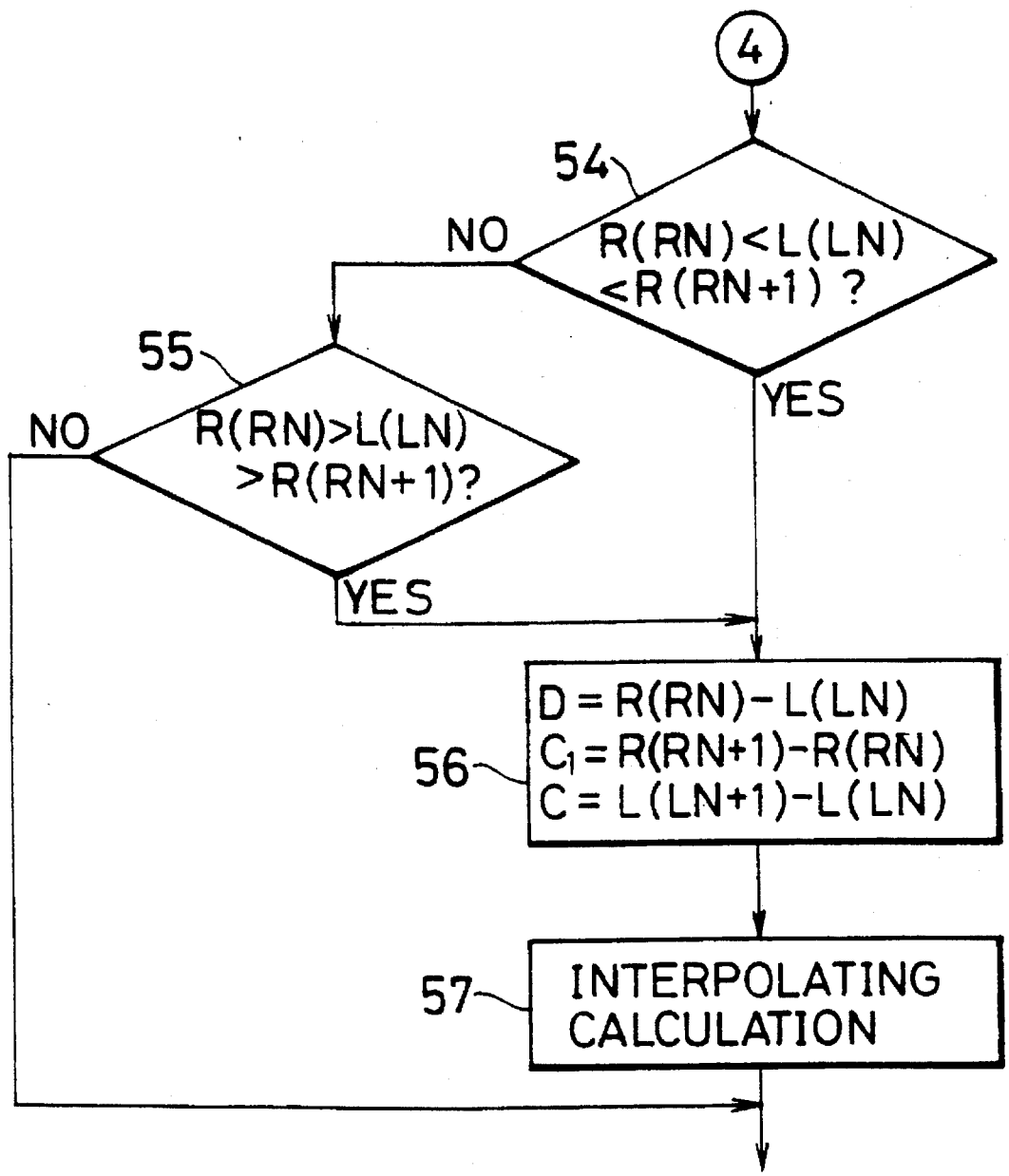
FIG. 12 is a flow chart showing detailed processing contents in processing steps #54 to #57 in the flow chart shown in FIG. 11.

After the interpolating calculation in the step #53 has been made, it proceeds to the step #54 shown in FIG. 12 through a junction point ④.

In the step #54, it is judged whether R(RN)<L(LN)<R(RN+1) is formed or not. When this judgment in the step #54 is YES, it proceeds to the next step #56.

In contrast to this, when the judgment in the step #54 is NO, it proceeds to a step #55. In this step #55, it is judged whether R(RN)>L(LN)>R(RN+1) is formed or not. When this judgment in the step #55 is YES, it proceeds to the step #56. In contrast to this, when the judgment in the step #55 is NO, it proceeds to a step #58 after a step #57 (see FIG. 10).

In this step #58, an address RN of each of the light-receiving elements $R_1$ to $R_n$ and an address LN of each of the light-receiving elements $L_1$ to $L_n$ are stepped by one. In the next step #59, it is judged whether the present address RN of each of the light-receiving elements $R_1$ to $R_n$ reaches an end address RE or not. When this judgment in the step #59 is NO, the processings from the step #42 to the step #58 are again executed.

In contrast to this, when the judgment in the step #59 is YES, predetermined steps have been executed from the present address RN to the end address RE so that it proceeds to a step #50. In this step #60, it is judged whether the present address LN of each of the light-receiving elements $L_1$ to $L_n$ reaches an end address LE or not. When this judgment in the step #60 is NO, the processings from the step #42 to the step #58 are again executed.

In contrast to this, when the judgment in the step #60 is YES, predetermined steps have been executed from the present address LN to the end address LE so that it proceeds to a step #61.

In this step #61, a final interpolating value AF and a final weight QC are calculated. The plus interpolating value AFP and the minus interpolating value AFM are added to each other. Further, the final weight QC is provided by adding the plus weight QCP and the minus weight QCM to each other. The final interpolating value AF is provided by dividing the added interpolating value AFP+AFM by the added weight QC.

The calculated final interpolating value AF and the calculated weight QC are transmitted to the focusing-driving control circuit 14 so that a focusing lens as the photographing lens 2 is moved and focused.

As mentioned above, in a focusing state or photographed object distance detector having a first structure of the present invention, image data providing a high conformity degree of image information in two systems are greatly weighted in comparison with image data providing a conformity degree which is not high. A focusing state or a distance of a photographed object is detected by calculating an image shifting amount of the image information in the above two systems. Accordingly, various kinds of calculated results can be obtained in a state in which data having many errors in calculations are substantially removed from the image data. Therefore, a focusing lens can be focused with high accuracy.

In a focusing state or photographed object distance detector having a second structure of the present invention, an image shifting amount is calculated by using only image data providing a high conformity degree of image information in two systems. A focusing state or a distance of a photographed object is detected by using this calculated image shifting amount. Accordingly, various kinds of calculations can be made in a state in which data having many errors in calculations are removed from the image data. Therefore, the focusing lens can be focused with high accuracy. Further, the number of calculating steps can be reduced so that the construction of the detector can be simplified.

In a focusing state or photographed object distance detector having a third structure of the present invention, a conformity degree of image information in two systems is set to a reliable parameter representing reliability of image reproducibility. Then, it is judged by using this parameter whether a focusing state or a distance of a photographed object can be detected or not by using the above image information. Accordingly, this detection can be judged reliably and accurately. Further, it is possible to suitably judge whether a distance measuring operation can be performed or not.

In a focusing state or photographed object distance detector having a fourth structure of the present invention, the height of a conformity degree of image information in two systems is evaluated by comparing inclinations of curves about the image information with each other every point of the image information. Accordingly, a distance measuring operation can be accurately performed in an entire region of image data.

Many widely different embodiments of the present invention may be constructed without departing from the spirit and scope of the present invention. It should be understood that the present invention is not limited to the specific embodiments described in the specification, except as defined in the appended claims.

What is claimed is:

1. A device for detecting a focusing state and a photographed object distance, said device comprising:

a pair of light receiving element arrays each offset from an optical axis and each configured to receive a light beam from a photographed object and output a respective image information waveform in accordance with a photographed object distance, each array of said pair comprising, a plurality of light receiving elements, said image information waveform comprising a series of image data generated from said plurality of light receiving elements, and having a deformation error component;

a first circuit which determines a degree of conformity between said image data from both arrays of said pair of element arrays;

a second circuit which weights each of said series of image data of said respective image information waveforms in accordance with said degree of conformity determined by said first circuit so as to produce respective corrected image data waveforms, said second circuit weighing a first subset of said image data having a high conformity degree determined by said first circuit greater than a second subset of said image data having a low conformity degree determined by said first circuit, so that said respective corrected image data waveforms have reduced amounts of said deformation error contained therein;

a third circuit which detects said focusing state and said photographed object distance by determining an image shifting amount between said respective corrected image information waveforms; and a fourth circuit which adjusts a focus in accordance with an output of said third circuit.

2. A device according to claim 1, further comprising means for indicating whether said state and said photographed object distance can be detected using the image information waveforms respectively outputted from said pair of light receiving element arrays and wherein said degree of conformity represents a reliability of image reproducibility.

3. A device according to any of claims 1 or 2, further comprising means for evaluating said degree of conformity of said image data by comparing respective inclined parts of said image information waveform.

4. A device for detecting a focusing state and a photographed object distance, said device comprising:

a pair of light receiving element arrays each offset from an optical axis and each configured to receive a light beam from a photographed object and output a respective image information waveform in accordance with a photographed object distance, each array of said pair of arrays comprising, a plurality of light receiving elements, respectively, each image information waveform comprising a series of image data generated from said plurality of light receiving elements, and having a deformation error component;

a first circuit which determines a degree of conformity between the series of image data from both arrays of said pair of light receiving element arrays;

a selection circuit which selects from each waveform a subset of image data having a degree of conformity greater than a predetermined degree and discards other image data in order to reduce the amount of deformation error component present in the respective waveforms;

a detection circuit which detects said focusing state and said photographed object distance by determining an image shifting amount between said image information waveforms in accordance with an output of said selection circuit; and a circuit which adjusts a focus in accordance with an output of said detection circuit.

5. A device according to claim 4, further comprising means for detecting whether said focusing state and said photographed object distance are detected based on said degree of conformity of said image data which represents a reliability of image reproducibility and based on the image information waveforms respectively outputted from said pair of light receiving element arrays.

6. A device according to any of claims 4 or 5, further comprising means for evaluating said degree of conformity of said image data by comparing respective inclined parts of said information waveforms.

7. A device for detecting a focusing state and a photographed object distance, said device comprising:

a pair of light receiving element arrays each an optical axis and each configured to receive a light beam from a photographed object and output a respective image information waveform in accordance with a photographed object distance, each array of said pair of arrays comprising, a plurality of light receiving elements, wherein
each image information waveform comprising a series of image data generated from said plurality of light receiving elements, and having a deformation error component; and a first circuit which determines a degree of conformity between said series of image data from both arrays of said pair of light receiving element arrays, wherein said degree of conformity is set as a reliable parameter representing a reliability of image reproducibility and said reliability is judged by using the reliable parameter to include whether the focusing state and the photographed object distance are detected by using the light beam received by said pair of light receiving element arrays.

8. A device according to claim 7, further comprising means for indicating whether said focusing state and said photographed object distance can be detected using the image information waveforms respectively outputted from said pair of light receiving element arrays and wherein said degree of conformity represents a reliability of image reproducibility.

9. A device according to any one of claims 7 or 8, further comprising means for evaluating said degree of conformity of said image data by comparing respective inclined parts of said information waveforms.

* * * * *